Figure 1:
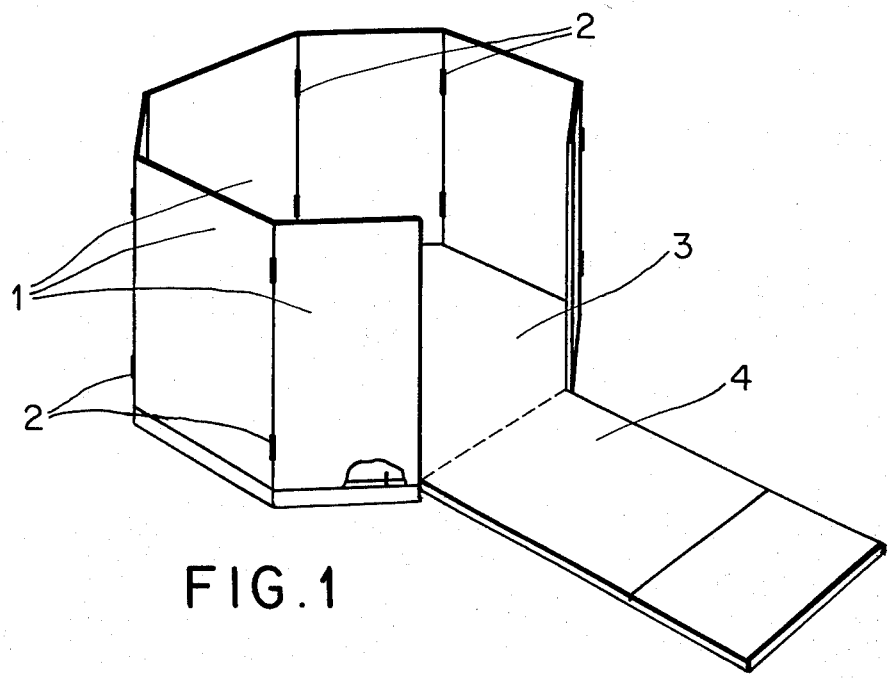

United States Patent [19]
Paz

[11] 3,991,769
[45] Nov. 16, 1976

[54] RADIATION CONCENTRATOR DEVICE FOR MEDICAL-AESTHETICAL USE

[76] Inventor: Carlos Fernandez-Sanguino Paz, Juan XXIII, 15-Huesca, Spain

[22] Filed: Apr. 7, 1975

[21] Appl. No.: 565,994

[52] U.S. Cl. .............................................. 128/372
[51] Int. Cl.² ............................................ A61N 33/06
[58] Field of Search ......................... 128/371–373; 135/1

[56] References Cited
UNITED STATES PATENTS

| | | | |
|---|---|---|---|
| 2,078,975 | 5/1937 | Roberts | 128/372 |
| 2,080,644 | 5/1937 | Weidman | 128/372 |
| 3,483,871 | 12/1969 | Wilson | 128/372 |

*Primary Examiner*—Lawrence W. Trapp
*Attorney, Agent, or Firm*—Ladas, Parry, Von Gehr, Goldsmith & Deschamps

[57] ABSTRACT

A solar or other radiation concentration device comprising non-flexible or foldable panels with reflective inner surfaces so arranged as to provide maximum reflection of said rays on a person or persons situated in the center of a casing of such panels.

4 Claims, 6 Drawing Figures

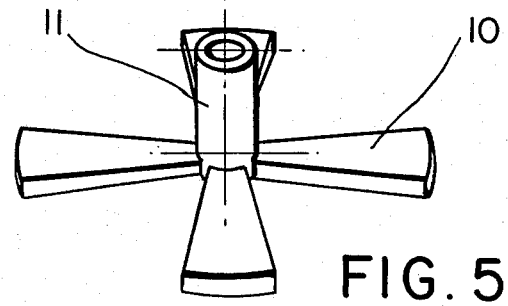
FIG. 5
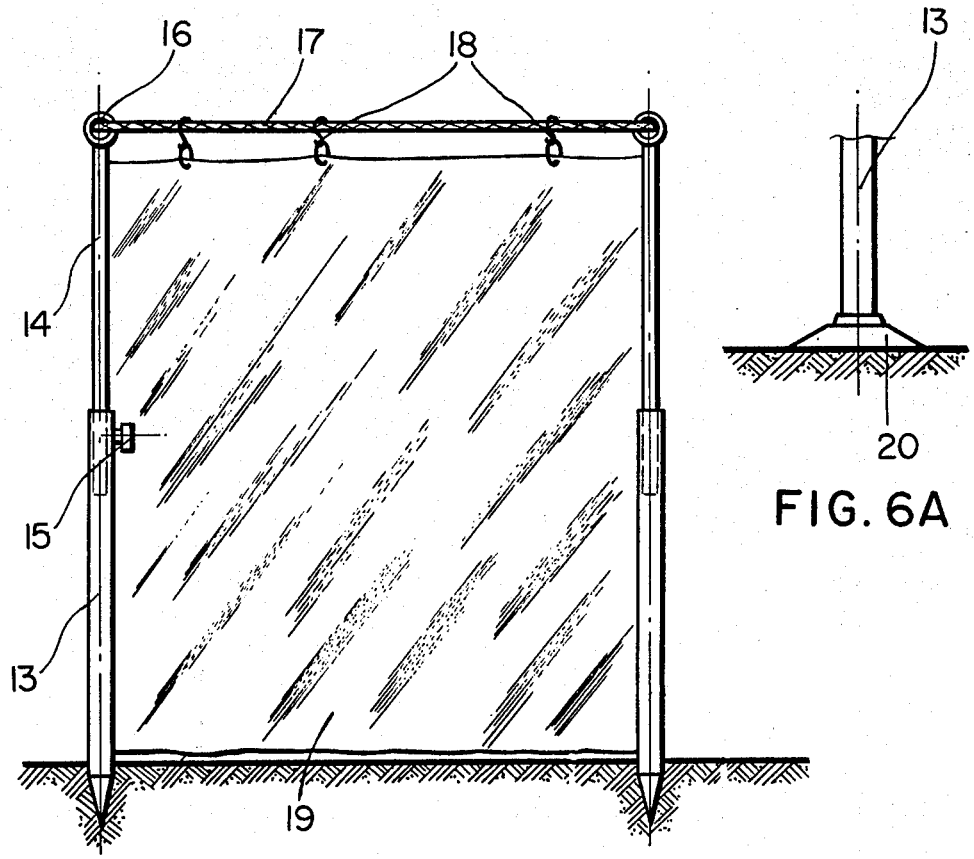
FIG. 6
FIG. 6A

RADIATION CONCENTRATOR DEVICE FOR MEDICAL-AESTHETICAL USE

This invention, as can be seen from the title, refers to a radiation concentrator device for medical-aesthetical use, and more specifically to an apparatus capable of concentrating the action of the solar rays, although it can also be used to pickup rays emitted by artificial means.

The basis of the object of the invention is to reflect the rays of the sun by means of a series of reflecting surfaces, directing the solar rays towards a person or persons who are situated within the field covered by the reflecting surfaces.

Consequently, the main purpose of the object of the invention is to benefit, medically-aesthetically, from the solar rays which are obtained in a perceptibly reduced period of time when compared with the time necessary in order to absorb the same amount of radiated energy, when this device is not available.

Along general lines, the object of the invention consists of a casing which can be non-flexible or foldable, based on a series of panels reflective to the rays, whether solar or artificial having similar characteristics, in the centre of which casing the person or persons to be subjected to the treatment will be situated.

Amongst the advantages which can be derived from the use of a device according to the invention, the following can be cited as being the most important:

1. Decrease in the time required to receive a like amount of radiation in a natural way, i.e. in the time which would be used when this device is not available.
2. The good condition of the skin is maintained activating the normal cutaneous metabolism which, as is known, is presently altered in many cases since it does not receive the necessary solar radiation.
3. Cutaneous therapeutic remedy, due to the stimulating action of the defences themselves, as well as to the disinfectant-bactericidal action which is very useful in cases of acne, furuncles, etc.
4. Therapeutic effect on the health in general, since the intensive receipt of solar radiation is an indispensable action in the formation of specific vitamins; a hyperaemia effect is likewise obtained due to the infrared rays, producers of heat, which are beneficial for rheumatic illnesses. The psychic state of the person subjected to this treatment is also improved, since the ancestral need for nature is somehow filled.

In any case, as a result of the improved physical state of the person on whom this device is used, an improvement in the psychic state is also obtained.

The effect which it produces in the elimination of the complexes, when the cause producing them is overcome, such as, for example, in the treatment of acne, pimples, pale color, etc., should also be borne in mind.

5. A more pleasing aesthetic is achieved since a natural bronze is obtained by means of this device in a matter of minutes.
6. Elimination of the conventional white or stripped zones caused by the use of swim suits, since it is possible, with the object of the invention, to discretely take the sun on the complete surface of the body.

The contemplated ray concentrator device will have various shapes, even though the casing will remain unaltered, and consequently, it will also have different sizes.

In order to have a better understanding of the essence of the invention, a description will subsequently be made in conjunction with the attached drawings representing the different practical modes of embodiment, which maintain the essence of the invention inasmuch as all of them deal with casings which should surround the person or persons placed to take the sun, on whose bodies the rays emitted by said heavenly body, or by any artifical ray emitting device having similar characteristics to the natural ones, are reflected.

The figures represented in such drawings illustrate the following:

FIG. 1 corresponds to a perspective view of a practical mode of embodiment which comprises the essence of the invention and which will be the constant of the various embodiments.

Figure 2:
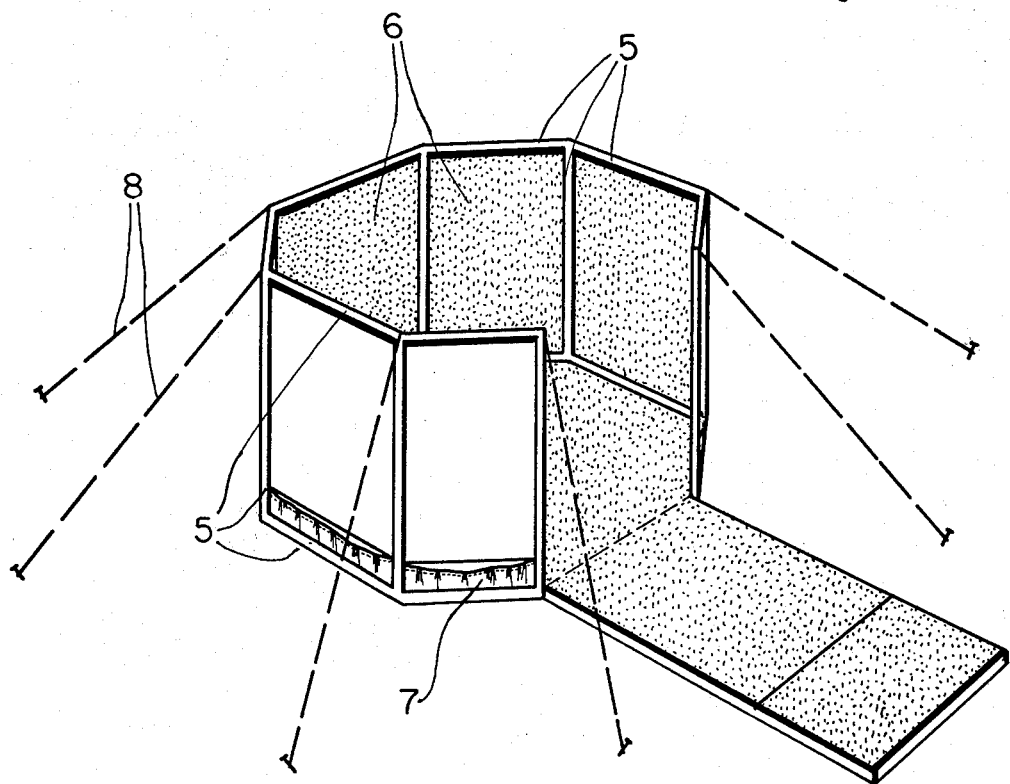

FIG. 2 also illustrates a perspective view of a device according to the invention which has the advantage of being portable and foldable, in virtue whereof, as will subsequently be explained, it is composed of an inflatable structure and of flexible panels.

Figure 3:
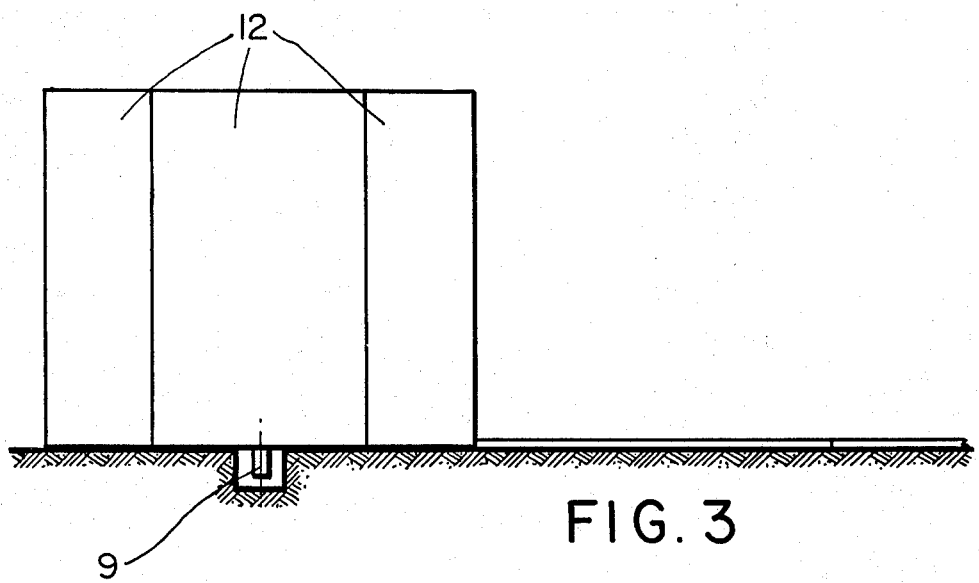

FIG. 3 corresponds to a side elevational view of a different mode of embodiment wherein, the surface forming the casing being unaltered, the device has fixedly been placed on, for example, the garden of a cottage.

Figure 4:
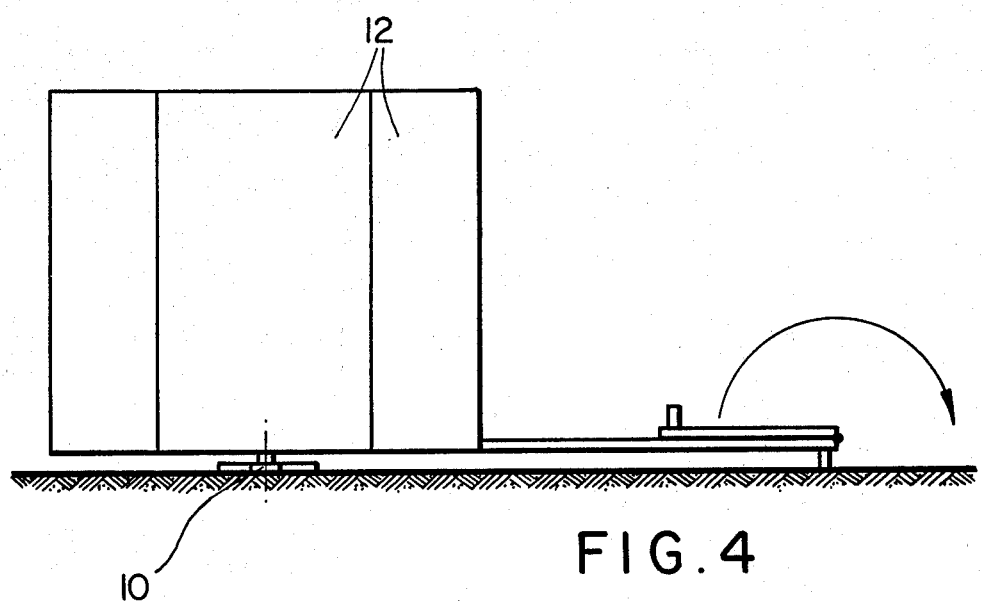

FIG. 4 corresponds to a view similar to that of the preceding figure, wherein the device can also be used, for example, in a cottage or an athletic club, in this case a base, on which the assembly of the casing can rotate, just as in the case of FIG. 3, has been incorporated to the device.

FIG. 5 corresponds to a perspective view of the base for supporting the device, according to the embodiment of FIG. 4.

FIG. 6 corresponds to a partial view of a different mode of embodiment of a device, constituted according to the invention, which can be defined as being the simplest since it comprises a series of telescopic tubes which can be fixed to the soil, when dealing for example with a garden, or else the lower portion thereof can be provided with a suction cup, as illustrated in the enlarged detail of said FIG. 6, to be adapted, for example, to the terrace of any house, in such a way that an assembly of telescopic tubes could form the structure of a casing for a reflecting fabric, a reflecting plastic, etc., which can be hung, for example, from a cord which connects the looped ends of each one of the tubular telescopic elements.

As can be seen from FIG. 1, reference 1 designates the different panels which are rectangular in shape and which are hinged to each other so as to form the casing on a surface, for example, the ground which is referenced 3.

One of the sides of said casing is open to permit access to the interior. The free edge of the surface 3 can be extended into a projection which is referenced 4, so that the visible face of this projection 4 as well as the ground 3 and the entire inner side surface of the casing formed by the panels 1, will be reflective, in such a way that the solar radiations will reach the body of the person placed in the centre of the device, covering the complete surface of the body of the user.

FIG. 2 illustrates the device which is perhaps the most useful of all the practical embodiments. It can be seen that same is composed of a structure which will be tubular, referenced 5, and which is made of a material which can be inflated (rubber, plastic, etc.) so that the surface 6 will be flexible. The inner surface thereof will also be reflective, as in the case of the preceding figure.

The lower portion of the outer surface of the device has a series of pockets 7 wherein counterweights are housed and, thus, a stability of the assembly is achieved. A series of brace rods or bracing wires, referenced 8, fixed to the floor or adhered thereto by means of a suction cup, can also assist in achieving the stability of the assembly.

Independently of the surface which forms the casing based on sheets 6 joined by means of the inflatable tubular structure 5, there will be a part acting as the ground, as in the case of FIG. 1, from which a projection will depart which will continue in front of what is known as the opening or the access door to the interior of the radiation concentrator device.

With regard to FIGS. 3 and 4, both illustrate a device which can be considered as the most perfect, although it has the disadvantage that it is not as convenient to transport as the two already mentioned devices, since although it can be dismantled to be conveyed, it is in reality an apparatus designed to remain stable and to be used especially in cottages, athletic clubs or centers, etc.

In the embodiment of FIG. 3, the device in question is constituted from a base or floor having a rigid nature, similar to that referenced 3 in FIG. 1, so that in the geometric center of such base there will be a tube referenced 9 which will be housed in a concrete block. The assembly of the casing is, thus, formed by panels 12 which can be coupled to each other and to the sides themselves formed by the polygon of the ground, level with the ground in question.

The inner surfaces of walls 12, as in anyone of the preceding cases, are reflective.

Projecting from the platform which constitutes the floor of the assembly, there is a portion, similar to that referenced 4 in FIG. 1, whose width is equal to the free space which serves as an access to the interior of the device, so that by means of said projection, a greater enlargement of the intensity of the received radiation is obtained.

The entire structure of the embodiment illustrated in FIG. 4 is practically the same as that illustrated in FIG. 3, with the exception that in this case the base which supports the assembly of the casing is arranged on a stand, in the form of an arm, referenced 10 in FIG. 5, which is provided, at its center, with a tubular element wherein the rod, which departs from the geometric centre of the platform constituting the floor of the casing, will be coupled. With this embodiment the device is fit to be adapted to a terrace or to any other spot where the position to be occupied by the apparatus is susceptible of being modified.

In combination with the devices illustrated in FIGS. 3 and 4 which, as has been said, are the most suitable for use in, for example, athletic clubs, a clock device can be installed. Such device is adapted to the shaft or rod which is joined to the supporting base of the platform or floor of the apparatus, which mechanism activated, for example, by coins, orient the device, when it is operated, in the direction of the sun, so that at the end of a determined pre-established period of time, the apparatus will be in the direction contrary to the sun or to the ray emitting focus. Thus, the device is no longer useful as a radiation concentrator.

Naturally, this case of the clock mechanism will be applicable in public centers and will, therefore, be eliminated in those embodiments related to domestic use.

Finally, there is another practical embodiment wherein the shape of the casing structure and the floor are maintained unaltered and the inner side surface of said casing is reflective, which embodiment is perhaps the simplest of all. A portion of said structure is schematically represented in FIG. 6.

As can be seen, the casing of this embodiment will be constituted on the basis of a structure formed by tubes 13 and 14 which can be coupled telescopically, each one of which forms what could be called a column whose height can be adjusted by means of a bolt stud 15 which fixes the position of the tube 14 with respect to tube 13.

Tube 13 can be inflated on the soil if, for example, it deals with a garden. However, if the installation is going to be carried out on, for example, the flooring of a terrace, each one of the tubes 13 of the various columns will have a suction cup 20, as illustrated in the enlarged detail of said FIG. 6.

The corresponding upper end of the extensible tubes 14 have, in turn, a ring referenced 16, so that a cord 17 will be made to pass through the various rings of each column. Thus, in the spaces formed between each two columns there will be a panel or a piece of cloth whose inner surface is reflective, such as the element referenced 19, which, by means of hooks 18, is hung from the cord 17.

This type of installation is, in reality, the simplest and naturally the medical-aesthetical effects thereof are completely alike to those which are obtained with the installations which have previously been commented.

The ideal size of the device with regards to height, irrespective of the mode of embodiment, will be of approximately 240 cm., inasmuch as the dimension of the ground, or considered as an imaginary diameter, will be of approximately 3 meters and the extension of the ground will be of about 3 meters.

It will be understood that when using anyone of the types of the radiation concentrator device described, the person will be placed in the geometric center of the ground and will, consequently, receive the direct action of the solar rays or of the device emitting artificial rays which are similar to those of the sun, at the same time as the reflection of the various walls, formed by the reflective panels or surfaces, will fall on the remaining portion of the body which does not directly receive the action of the sun.

I claim:

1. A radiation concentration device for medical-aestheticl use, comprising a series of reflective solar ray panels, each of said panels being substantially vertically disposed and adjacent to each other to form a prismatic casing, said panels being coupled about a surface defining a polygon shaped base, said base being reflective to solar rays, said casing being accesible through an opening located in one of the sides of said casing, a horizontally extending panel located at the bottom of said opening in alignment with said base of said casing, the base and the panels being rotatably mounted with respect to a supporting surface, each of said panels including a flexible tube which can be inflated to contain pneumatic pressure sufficient to support each panel in erect position, said panels further including reflective tissue, and said panels still further including means for holding weights to add stability to said casing.

2. A radiation concentration device for medical-asethetical use, comprising a series of reflective solar ray panels, each of said panels being substantially vertically disposed and adjacent to each other to form a prismatic casing, said panels being coupled about a surface defining a polygon shaped base, said base being reflective to solar rays, said casing being accesible through an opening located in one of the sides of said casing, a horizontally extending panel located at the bottom of said opening in alignment with said base of said casing, each of said vertical panels being provided at its upper edge with a plurality of means for suspending said panel from a string, a plurality of telescopic extensible columns each having at its upper end a ring to receive and support said string, said columns being attachable to the floor coinciding with the vertexes of said polygon shaped base forming the surface defined by the prismatic casing.

3. A radiation concentration device for medical-aesthetical use according to claim 2, wherein said suspending means for each reflective panel includes a hook which links each said panel with the string extending between the columns, and the lower ends of said columns being pointed and thereby adapted to be pressed into the ground.

4. A radiation concentration device for medical-aesthetical use according to claim 2, wherein said suspending means for each reflective panel includes a hook which links each said panel with the string extending between the columns, and vacuum cups located at the lower ends of said columns whereby said columns may be removably affixed to a terrace floor.

* * * * *